United States Patent
Wang

(10) Patent No.: US 12,548,999 B2
(45) Date of Patent: Feb. 10, 2026

(54) ACTIVE CURRENT LIMITING CIRCUIT, POWER SUPPLY DEVICE, POWER SUPPLY SYSTEM AND CONTROL METHOD

(71) Applicant: Aplus Power Technology (Hangzhou) Co., Ltd., Hangzhou (CN)

(72) Inventor: Yuetian Wang, Hangzhou (CN)

(73) Assignee: Aplus Power Technology (hangzhou) Co., Ltd., Hangzhou (CN)

( * ) Notice: Subject to any disclaimer, the term of this patent is extended or adjusted under 35 U.S.C. 154(b) by 208 days.

(21) Appl. No.: 18/448,752

(22) Filed: Aug. 11, 2023

(65) Prior Publication Data

US 2024/0055855 A1 Feb. 15, 2024

(30) Foreign Application Priority Data

Aug. 12, 2022 (CN) .......................... 202210971987.6

(51) Int. Cl.
*H02H 9/02* (2006.01)
*H02M 1/32* (2007.01)
(Continued)

(52) U.S. Cl.
CPC ................ *H02H 9/02* (2013.01); *H02M 1/32* (2013.01); *H02M 1/42* (2013.01); *H02M 3/155* (2013.01)

(58) Field of Classification Search
CPC .......... H02H 9/02; H02M 3/155; H02M 1/32; H02M 1/42; H02M 1/4233; H02M 1/325; H02M 1/36; H02M 1/10
(Continued)

(56) References Cited

U.S. PATENT DOCUMENTS 5,563,781 A * 10/1996 Clauter ............... H02M 1/4225
  363/124
6,055,167 A * 4/2000 Shamkovich ....... H02M 1/4225
  363/54
(Continued)

FOREIGN PATENT DOCUMENTS

CN 201904614 U 7/2011
CN 105099160 A 11/2015

*Primary Examiner* — Danny Nguyen
(74) *Attorney, Agent, or Firm* — Hanley, Flight & Zimmerman, LLC

(57) ABSTRACT

Embodiments of this disclosure provide an active current limiting circuit, a power supply device, a power supply system and a control method, wherein multiple current limiting switches in the active current limiting circuit are turned on or off according to the current sampling signal and the result of comparison of voltages obtained by sampling currents in the current limiting switch unit of the active current limiting circuit or currents in the power factor correction circuit and voltages at the first end and second end of the input bus. With the active current limiting circuit, the inrush current generated in switching the power supply lines may be efficiently reduced, power consumption may be lowered, output of large power may be provided, the capacitor may be charged and sufficient power output may be provided to the load. And furthermore, multiple current limiting switches may be flexibly controlled by using the current sampling signal and the result of comparison of the voltages at the two ends of the input bus, thereby improving operating efficiency of the current limiting circuit.

15 Claims, 16 Drawing Sheets

(51) Int. Cl.
 *H02M 1/42* (2007.01)
 *H02M 3/155* (2006.01)
(58) Field of Classification Search
 USPC .......................................................... 361/18
 See application file for complete search history.

(56) References Cited

U.S. PATENT DOCUMENTS

| | | | | |
|---|---|---|---|---|
| 2013/0308356 | A1* | 11/2013 | Subramanium ..... | H02M 1/4258 |
| | | | | 363/53 |
| 2014/0103861 | A1* | 4/2014 | Carletti ............... | H02M 1/4225 |
| | | | | 323/205 |
| 2022/0407309 | A1* | 12/2022 | Hsiao .................... | H02H 7/125 |

* cited by examiner

ACTIVE CURRENT LIMITING CIRCUIT, POWER SUPPLY DEVICE, POWER SUPPLY SYSTEM AND CONTROL METHOD

CROSS-REFERENCE TO RELATED APPLICATIONS

This application claims priority to Chinese Patent Application No. 202210971987.6, filed on Aug. 12, 2022, which is hereby incorporated by reference in its entirety.

TECHNICAL FIELD

This disclosure relates to the field of power supply, and in particular to an active current limiting circuit, a power supply device, a power supply system and a control method.

BACKGROUND

In a power supply system, it is necessary for a power supply to meet two aspects of redundancy design: redundancy design for input power supply and redundancy design for power supply. In a conventional single input power supply, in order to achieve redundant design of input power supply, that is, when one path of input loses power, it is necessary to ensure normal output of the entire power supply. If a certain power supply system requires N power supplies, N+N power supplies are needed to achieve redundant design of input power supply, wherein N power supplies are connected to input power supply A, and the other N power supplies are connected to input power supply B. On the basis of N+N power supplies, it is possible to achieve redundant design of power supplies, that is, if one of the power supplies fails, other N+N−1 power supplies may still meet the needs of N power supplies.

Another power supply architecture is use of an ATS (automatic transfer switch) power supply. The ATS power supply refers to a power supply with a function of automatically transferring between two input power supplies, and its working principle is that when both paths of input are normal, the transfer switch of the ATS power supply selects one path for power supply, and when the power supply of this path loses power, the transfer switch of the ATS power supply may switch to the other path for power supply. The power supply architecture adopts N power supplies to meet the redundancy design of input power supply. When one path of input loses power, the redundancy design of input may be achieved by transfer of the ATS power supply. On the basis of N power supplies, in order to achieve redundancy design of the power supply, it is necessary to add one power supply, that is, N+1 power supplies may achieve redundancy of input power supply and redundancy design of power supply.

However, for ATS power supplies, in transferring the input power supply by the transfer switch of the ATS power supply, the input power supply may have a large inrush current on bulk capacitance at the output side of a power factor correction (PFC) circuit. For example, input power supply A initially supplies power, and at this moment, input power supply A powers off, in order to meet input ride via, it needs to wait for half a power frequency cycle Ts/2 (10 ms) to cut off input power supply A, and then cut in power supply B. At present, the transfer switch of the ATS power supply mainly uses a relay, and a transfer time Trelay of the relay is about 5 ms. Therefore, after the input power supply A powers off for Ts/2+2Tree, a voltage of the bulk capacitor will be decreased due to an output load. When the input power supply B is cut in, if a voltage at the time of cut in is much higher than the bulk voltage, and if there is no current limiting circuit on the line, there will be a large inrush current to the bulk capacitor, causing damage to a previous power supply device.

In order to solve the problem of inrush current of the ATS power supply, an existing method is to increase a capacity of the bulk capacitor, so that the voltage of the bulk capacitor is still greater than the input voltage after the time of Ts/2+2Tree; and another method is to add a current limiting circuit in the line, and a resistive passive current limiting circuit is commonly used at present.

It should be noted that the above description of the background is merely provided for clear and complete explanation of this disclosure and for easy understanding by those skilled in the art. And it should not be understood that the above technical solution is known to those skilled in the art as it is described in the background of this disclosure.

SUMMARY

However, in order to solve the problem of inrush current of an ATS power supply, increasing the capacity of the bulk capacitor will lead to an increase in cost, power loss and the volume of the power supply, and flexible control is unable to be achieved; and a current limiting circuit needs to be able to provide high-power output to charge a bulk capacitor and provide load output. If a resistive passive current limiting circuit is used, the volume of the power supply will be relatively large, there will also be significant power loss, furthermore, flexible control is unable to be achieved.

Addressed to at least one of the above problems, embodiments of this disclosure provide an active current limiting circuit, a power supply device, a power supply system and a control method. With the active current limiting circuit, the inrush current generated in switching the power supply lines may be efficiently reduced, power consumption may be lowered, output of large power may be provided, the capacitor may be charged and sufficient power output may be provided to the load. Furthermore, multiple current limiting switches may be flexibly controlled by using the current sampling signal and the result of comparison of the voltages at the two ends of the input bus, thereby improving operating efficiency of the current limiting circuit.

According to a first aspect of the embodiments of this disclosure, there is provided an active current limiting circuit, applicable to a power supply system, the power supply system including at least two input power supply lines, an input bus, a power factor correction circuit, a capacitor, and the active current limiting circuit, the power factor correction circuit being coupled via the input bus to the at least two input power supply lines that are able to be switched, and the capacitor being connected to an output side of the power factor correction circuit, and the active current limiting circuit including: a current limiting switch unit including multiple current limiting switches, wherein an input end of the current limiting switch unit is connected to the input bus, and an output end of the current limiting switch unit is connected to the power factor correction circuit, the current limiting switch unit being configured to turn on or off the multiple current limiting switches according to a current sampling signal in the current limiting switch unit or a current sampling signal in the power factor correction circuit and a result of comparison of voltages at a first end and a second end of the input bus.

According to a second aspect of the embodiments of this disclosure, there is provided a power supply device, the power supply device including the active current limiting circuit as described in the first aspect.

According to a third aspect of the embodiments of this disclosure, there is provided a power supply system, the power supply system including at least two input power supply lines, an input bus, a power factor correction circuit, a capacitor, and the active current limiting circuit as described in the first aspect, the power factor correction circuit being coupled via the input bus to the at least two input power supply lines that are able to be switched, and the capacitor being connected to an output side of the power factor correction circuit.

According to a fourth aspect of the embodiments of this disclosure, there is provided a method for controlling an active current limiting circuit, the method including: sampling currents in a current limiting switch unit of the active current limiting circuit as described in the first aspect or currents in a power factor correction circuit of the active current limiting circuit as described in the first aspect and voltages at a first end and second end of an input bus to respectively obtain a current sampling signal and a result of comparison of the voltages at the first end and the second end of the input bus; generating a control signal for controlling on or off of the multiple current limiting switches according to the current sampling signal and the result of comparison of the voltages; and driving the multiple current limiting switches based on the control signal to charge the capacitor or limit currents.

An advantage of the embodiments of this disclosure exists in that multiple current limiting switches in the active current limiting circuit are turned on or off based on the current sampling signal and the result of comparison of voltages obtained by sampling currents in the current limiting switch unit of the active current limiting circuit or currents in the power factor correction circuit and voltages at the first end and second end of the input bus. With the active current limiting circuit, the inrush current generated in switching the power supply lines may be efficiently reduced, power consumption may be lowered, output of large power may be provided, the capacitor may be charged and sufficient power output may be provided to the load. Furthermore, multiple current limiting switches may be flexibly controlled by using the current sampling signal and the result of comparison of the voltages at the two ends of the input bus, thereby improving operating efficiency of the current limiting circuit.

With reference to the following description and drawings, the particular embodiments of this disclosure are disclosed in detail, and the principle of this disclosure and the manners of use are indicated. It should be understood that the scope of the embodiments of this disclosure is not limited thereto. The embodiments of this disclosure contain many alternations, modifications and equivalents within the scope of the terms of the appended claims.

BRIEF DESCRIPTION OF THE DRAWINGS

The accompanying drawings described herein are for explanation only, and are not intended to limit the scope of this disclosure in any way. In addition, shapes and proportional dimensions of the components in the drawings are illustrative only and are intended to assist in understanding this disclosure, but are not intended to specifically limit the shapes and proportional dimensions of the components in this disclosure. With the teachings of this disclosure, those skilled in the art may choose various possible shapes and proportional sizes according to specific circumstances to implement this disclosure.

DETAILED DESCRIPTION

The technical solutions of this disclosure shall be explained below in detail with reference to the accompanying drawings and specific embodiments. It should be understood that these embodiments are only used to illustrate this disclosure and not to limit the scope of this disclosure. After reading this disclosure, all modifications to various equivalent forms of this disclosure by those skilled in the art will fall within the scope of the claims attached to this disclosure.

In the embodiments of this disclosure, terms "first", and "second", etc., are used to differentiate different elements with respect to names, and do not indicate spatial arrangement or temporal orders of these elements, and these elements should not be limited by these terms. Terms "and/or" include any one and all combinations of one or more relevantly listed terms. Terms "contain", "include" and "have" refer to existence of stated features, elements, components, or assemblies, but do not exclude existence or addition of one or more other features, elements, components, or assemblies.

All technical and scientific terms used herein have the same meanings as commonly understood by those skilled in the art to which this disclosure pertains, unless otherwise defined. The terminology used in the description of this disclosure is for the purpose of describing particular embodiments and is not intended to limit this disclosure. The term "and/or" as used herein includes any and all combinations of one or more of the associated listed items.

Embodiment 1

The embodiments of this disclosure provide an active current limiting circuit. The active current limiting circuit is applicable to a power supply system, the power supply system including at least two input power supply lines, an input bus, a power factor correction circuit, a capacitor, and the active current limiting circuit.

Figure 1:
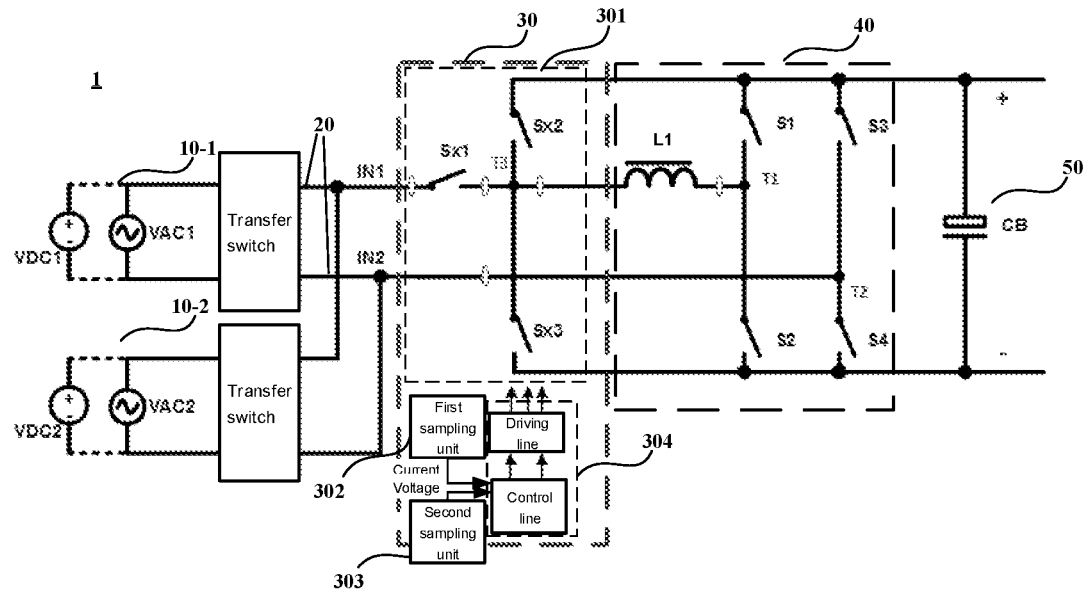
FIG. 1 is a circuit structure diagram of an implementation of a power supply system where an active current limiting circuit is located in an embodiment of this disclosure.

FIG. 1 is a circuit structure diagram of an implementation of the power supply system where the active current limiting circuit is located in the embodiment of this disclosure. As shown in FIG. 1, a power supply system 1 includes two input power supply lines 10-1 and 10-2, an input bus 20, an active current limiting circuit 30, a power factor correction circuit 40, and a capacitor 50. The capacitor 50 is, for example, a bulk capacitor, i.e. a capacitor CB in FIG. 1.

As shown in FIG. 1, the power factor correction circuit 40 is coupled to two input power supply lines 10-1 and 10-2 able to be switched via the input bus 20, the capacitor 50 is connected to an output side of the power factor correction circuit 40, and the active current limiting circuit 30 is arranged between the input bus 20 and the power factor correction circuit 40. The input bus 20 is connected to positive and negative ends of the output side of the transfer switch of the two input power supply lines 10-1 and 10-2.

In FIG. 1, two power supply lines are taken as examples for illustration, but this disclosure may also include three or more power supply lines, such as N+N power supply lines, where, N is a positive integer. In addition, as shown in FIG. 1, in the power supply lines, a transfer switch is configured to switch which power supply line is used.

In some embodiments, the power factor correction circuit 40 may be a bridgeless factor correction circuit; however, a type and structure of the power factor correction circuit is not limited in this disclosure.

As shown in FIG. 1, the active current limiting circuit 30 includes a current limiting switch unit 301, and the bidirectional switch unit 301 includes multiple current limiting switches. Description is given in FIG. 1 by taking three current limiting switches as an example, namely, a first current limiting switch S×1, a second current limiting switch S×2 and a third current limiting switch S×3, wherein S×1 is a bidirectional switch, and S×2 and S×3 may be bidirectional switches, or may be unidirectional switches.

However, this disclosure is not limited thereto, that is, the current limiting switch unit 301 may include two current limiting switches, or may include four or more current limiting switches, and a specific number of current limiting switches included in the current limiting switch unit 301 may be determined as actually needed.

The input end of the current limiting switch unit 301 is connected to the input bus 20, and the output end of the current limiting switch unit 301 is connected to the power factor correction circuit 40. The current limiting switch unit 301 is configured to turn on or off at least one bidirectional switch, such as the first limit switch S×1, the second limit switch S×2 and the third limit switch S×3 in FIG. 1, according to the current sampling signal in the current limiting switch unit 301 or the power factor correction circuit 40 and a result of comparison of voltages (potentials) of a first end IN1 and a second end IN2 of the input bus 20. The first output end and the second output end of the current limiting switch unit 301 are respectively connected to the power factor correction circuit 40.

As shown in FIG. 1, the first end of the first current limiting switch S×1 is connected to the first end IN1 of the input bus 20, the second end of the first current limiting switch S×1 is connected at a third terminal T3 between the second current limiting switch S×2 and the third current limiting switch S×3, the first end of the second current limiting switch S×2 is connected to the third terminal T3, the second end of the second current limiting switch S×2 is connected to the first output end of the current limiting switch unit 301, the first end of the third current limiting switch S×3 is connected to the third terminal, and the second end of the third current limiting switch S×3 is connected to the second output end of the current limiting switch unit 301.

Figure 2:
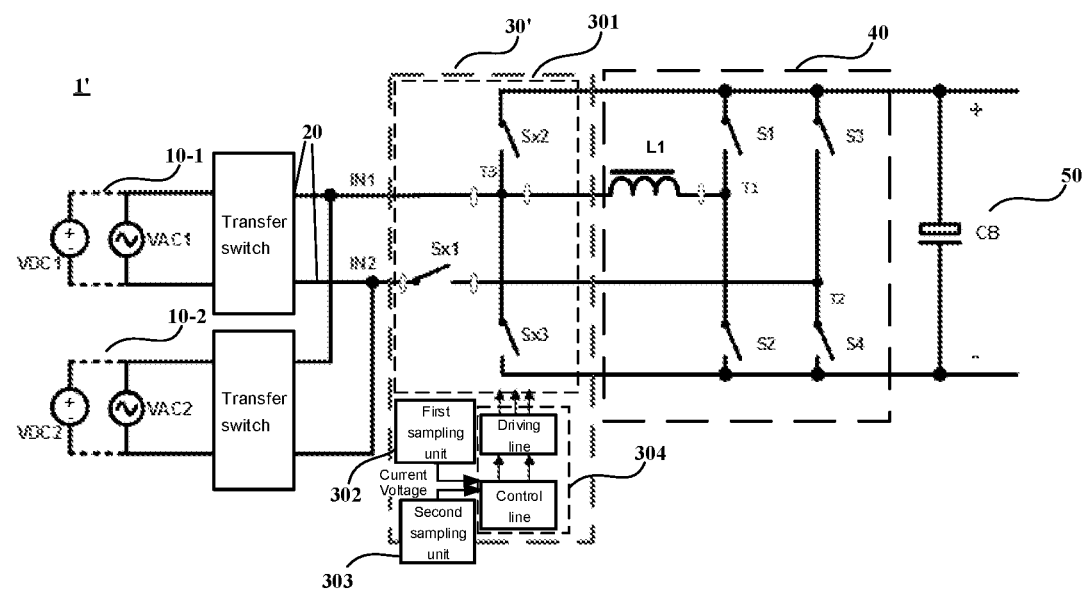
FIG. 2 is a circuit structure diagram of another implementation of the power supply system where the active current limiting circuit is located in the embodiment of this disclosure.

FIG. 2 is a circuit structure diagram of another implementation of the power supply system where the active current limiting circuit is located in the embodiment of this disclosure. As shown in FIG. 2, a structure of a power supply system 1' is similar to that of power supply system 1 in FIG. 1, except that the structure of the current limiting switch unit 301' in the power supply system 1' is slightly different from that of the current limiting switch unit 301. For example, the first current limiting switch S×1 in the current limiting switch unit 301 is connected to the first end IN1 of the input bus 20, while the first current limiting switch S×1 in the current limiting switch unit 301' is connected to the second end IN2 of the input bus 20.

As shown in FIG. 2, the first end of the first current limiting switch S×1 is connected to the second end IN2 of the input bus 20, the second end of the first current limiting switch S×1 is connected at a second terminal T2 between the two switches S3 and S4 of the power factor correction circuit 40, the first end of the second current limiting switch S×2 is connected at the third terminal T3 between the first end IN1 of the input bus 20 and an input end of a first inductor L1 of the power factor correction circuit 40, the second end of the second current limiting switch S×2 is connected to the first output end of the current limiting switch unit 301, the first end of the third current limiting switch S×3 is connected to the third terminal T3, and the second end of the third current limiting switch S×3 is connected to the second output end of the current limiting switch unit 301.

In some embodiments, as shown in FIG. 1 and FIG. 2, the active current limiting circuit 30 further includes a first sampling unit 302, a second sampling unit 303 and a control unit 304.

Wherein, the first sampling unit 302 is configured to sample currents in the current limiting switch unit 301 or currents in the power factor correction circuit 40 to obtain a current sampling signal; for example, the first sampling unit 302 samples a current on any one of branches marked with an ellipse in FIG. 1, i.e. a first branch between the first end of the first current limiting switch Sx1 and the first end IN1 of the input bus 20, a second branch between the second end of the first current limiting switch Sx1 and the third terminal T3, and a third branch between the third terminal T3 and the input end of the first inductor L1.

The second sampling unit 303 is configured to sample and compare the voltages at the first end IN1 and second end IN2 of the input bus 20 to obtain the result of comparison of the voltages at the first end IN1 and the second end IN2.

The control unit 304, for example, is composed of a control line and a driving line, and is configured to generate a control signal for controlling on or off of the first current limiting switch Sx1, the second current limiting switch Sx2 and the third current limiting switch Sx3 according to the current sampling signal and the result of comparison of the voltages, and drive the first current limiting switch Sx1, the second current limiting switch Sx2 and the third current limiting switch Sx3 according to the control signal to charge the capacitor CB or limit currents, that is, follow the current of the first inductor L1 in the power factor correction circuit 40 to achieve a function of current limiting.

In some embodiments, in a case where the first voltage is higher than the second voltage, the control unit 304 generates a first control signal when an absolute value of the current sampling signal is less than a first threshold, and drives the first current limiting switch Sx1, the second current limiting switch Sx2 and the third current limiting switch Sx3 based on the first control signal, so that the power factor correction circuit 40 charges the capacitor CB, and generates a second control signal when the absolute value of the current sampling signal is greater than or equal to the first threshold, and drives the first current limiting switch Sx1, the second current limiting switch Sx2 and the third current limiting switch Sx3 based on the second control signal, so as to follow the current of the first inductor L1 in the power factor correction circuit 40 to limit currents.

In some embodiments, in a case where the first voltage is higher than the second voltage, the control unit 304 generates a third control signal when an absolute value of the current sampling signal is less than a first threshold, and drives the first current limiting switch Sx1, the second current limiting switch Sx2 and the third current limiting switch Sx3 based on the third control signal, so that the power factor correction circuit 40 charges the capacitor CB, and generates a fourth control signal when the absolute value of the current sampling signal is greater than or equal to the first threshold, and drives the first current limiting switch Sx1, the second current limiting switch Sx2 and the third current limiting switch Sx3 based on the fourth control signal, so as to follow-up the current of the first inductor L1 in the power factor correction circuit 40 to limit currents.

In some embodiments, the specific value of the first threshold may be set according to an actual situation.

As shown in FIG. 1 and FIG. 2, the power factor correction circuit 40 includes a first switch S1, a second switch S2, a third switch S3, a fourth switch S4 and a first inductor L1, an input end of the first inductor L1 of the power factor correction circuit is connected at the third terminal T3, an output end of the first inductor L1 is connected at a first terminal T1 between the first switch S1 and the second switch S2, the first end of the first switch S1 is connected to the first output end of the current limiting switch unit 301, the second end of the first switch S1 and the first end of the second switch S2 are connected to the first terminal T1, and a second end of the second switch S2 is connected to the second output end of the current limiting switch unit 301. Furthermore, a first end of the third switch S3 is connected to the first end of the first switch S1 and a positive pole of the capacitor CB, a second end of the third switch S3 and a first end of the fourth switch S4 are connected to the second terminal T2, and a second end of the fourth switch S4 and the second end of the second switch S2 are connected to a negative pole of the capacitor CB.

In some embodiments, S1 may be conducted at least from T1 to +bulk (the positive pole of the capacitor CB), S2 may be conducted at least from −bulk (the negative pole of the capacitor CB) to T1, S3 may be conducted at least from T2 to +bulk, and S4 may be conducted at least from −bulk to T2.

In the current limiting switch unit 301 or 301', one end of Sx2 is connected to +bulk, the other end is connected to a front end T3 of the first inductor L1, one end of Sx3 is connected to −bulk, and the other end is connected to T3; wherein Sx1 is a bidirectional switch, and Sx2 and Sx3 may be bidirectional switches or unidirectional switches. Sx2 may be conducted at least from T3 to +bulk in a turn-on state, and is bidirectionally cut-off in a turn-off state. Sx3 may be conducted at least from −bulk to T3 in a turn-on state, and is bidirectionally cut-off in a turn-off state.

For example, a control process of the active current limiting circuit 30 or 30' is as follows:

in the case where the first voltage at IN1 is higher than the second voltage at IN2, when the absolute value of the current sampling signal is less than the first threshold, the control unit 304 generates a first control signal that turns off the second current limiting switch Sx2, turns on the first current limiting switch Sx1 and causes the third current limiting switch Sx3 to be in a cut-off state from the third terminal T3 to the negative pole of the capacitor CB, and drives the first current limiting switch Sx1, the second current limiting switch Sx2 and the third current limiting switch Sx3 based on the first control signal, so that the input voltage of the power factor correction circuit 40 charges the capacitor CB via the first inductor L1, the first switch S1 and the fourth switch S4; and when the absolute value of the current sampling signal is greater than or equal to the first threshold, the control unit 304 generates a second control signal that turns off the second current limiting switch Sx2, turns off the first current limiting switch Sx1 and causes the third current limiting switch Sx3 to be in a conducted state from the negative pole of the capacitor CB to the third terminal T3, and drives the first current limiting switch Sx1, the second current limiting switch Sx2 and the third current limiting switch Sx3 based on the second control signal, so as to follow the current of the first inductor L1 in the power factor correction circuit 40 via the third current limiting switch Sx3 and the first current limiting switch Sx1 to limit currents;

in the case where the first voltage at IN1 is lower than the second voltage at IN2, when the absolute value of the current sampling signal is less than the first threshold, the control unit 304 generates a third control signal that turns off the third current limiting switch Sx3, turns on the first current limiting switch Sx1 and causes the second current limiting switch Sx2 to be in a cut-off state from the positive pole of the capacitor CB to the third terminal T3, and drives the first current limiting switch S×1, the second current limiting switch S×2 and the third current limiting switch S×3 based on the third control signal, so that the input voltage of the power factor correction circuit 40 charges the capacitor CB via the first inductor L1, the second switch S2 and the third switch S3; and when the absolute value of the current sampling signal is greater than or equal to the first threshold, the control unit 304 generates a fourth control signal that turns off the third current limiting switch S×3, turns off the first current limiting switch S×1 and causes the second current limiting switch S×2 to be in a conducted state from the third terminal T3 to the positive pole of the capacitor CB, and drives the first current limiting switch S×1, the second current limiting switch S×2 and the third current limiting switch S×3 based on the fourth control signal, so as to follow the current of the first inductor L1 in the power factor correction circuit 40 via the second current limiting switch S×2 and the fourth current limiting switch S×4 to limit currents.

The control process of the control unit 304 is explained above by taking that the current limiting switch unit 301 or 301' includes three current limiting switches as an example. The current limiting switch unit of this disclosure may also use other numbers of current limiting switches, such as two or four current limiting switches, and the control unit 304 controls the two or four current limiting switches based on the current sampling signal and the result of comparison of voltages at both ends of the input bus to charge the capacitor CB, or follows the current of inductor of the power factor correction circuit to limit currents.

In some embodiments, the first switch S1 and the second switch S2 are controllable switch tubes, such as an S1 MOS, an SIC MOS, and a GaN HEMT. And furthermore, the first switch S1 and the second switch S2 may operate in a high-frequency mode.

The third switch S3 and the fourth switch S4 are diodes or controllable switch tubes, such as an S1 MOS, an SIC MOS, and a GaN HEMT. And furthermore, the third switch S3 and the fourth switch S4 may operate in an input operating-frequency mode; wherein a controllable switch tube works as a synchronous rectifier tube to reduce conduction loss of a diode.

That is, a frequency F1 of switches S1 and S2 in operation is greater than a frequency F2 of switches S3 and S4 in operation.

In some embodiments, the second switch S2 and the fourth switch S4 are controllable switch tubes, such as Si MOSs, SIC MOSs, and GaN HEMTs. In addition, the second switch S2 and the fourth switch S4 may operate in a high-frequency or low-frequency mode according to positive or negative input voltage;

and the first switch S1 and the third switch S3 are diodes or controllable switch tubes, such as Si MOSs, SIC MOSs, and GaN HEMTs, and may operate in a high-frequency or low-frequency mode according to positive or negative input voltage; wherein a controllable switch tube works as a synchronous rectifier tube to reduce conduction loss of a diode.

In some embodiments, the power factor correction circuit 40 further includes a fifth switch S5 arranged between the first terminal T1 and the second terminal T2. The fifth switch S5 is a bidirectional switch, and in addition, the fifth switch S5 may operate in a high-frequency mode;

in this case, the first switch S1, the second switch S2, the third switch S3 and the fourth switch S4 are diodes or controllable switch tubes, such as Si MOSs, SIC MOSs, and GaN HEMTs; wherein a controllable switch tube works as a synchronous rectifier tube to reduce conduction loss of a diode.

Figure 3:
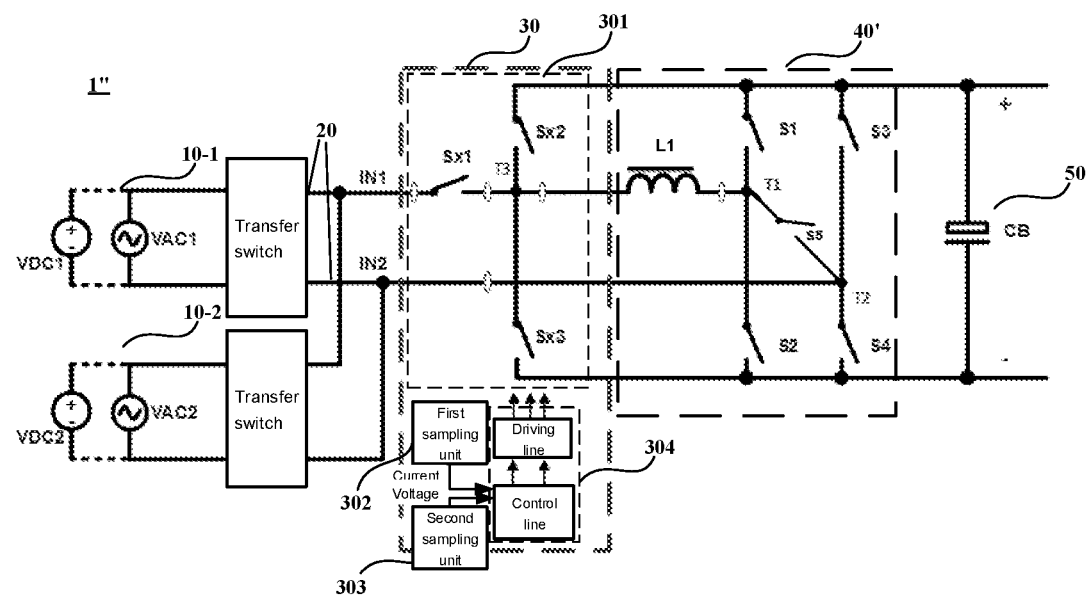
FIG. 3 is a circuit structure diagram of a further implementation of the power supply system where the active current limiting circuit is located in the embodiment of this disclosure.
Figure 4:
FIG. 4 is a schematic diagram of a structure of a bidirectional switch in the current limiting switch unit of the embodiment of this disclosure.
Figure 5:
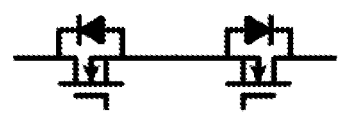
FIG. 5 is a schematic diagram of another structure of the bidirectional switch in the current limiting switch unit of the embodiment of this disclosure.
Figure 6:
FIG. 6 is a schematic diagram of a further structure of the bidirectional switch in the current limiting switch unit of the embodiment of this disclosure.
Figure 7:
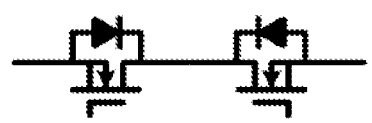
FIG. 7 is a schematic diagram of still another structure of the bidirectional switch in the current limiting switch unit of the embodiment of this disclosure.
Figure 8:
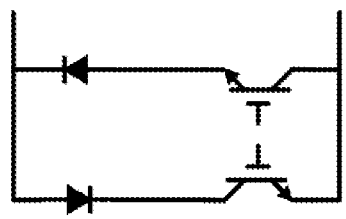
FIG. 8 is a schematic diagram of yet another structure of the bidirectional switch in the current limiting switch unit of the embodiment of this disclosure.

FIG. 3 is a circuit structure diagram of a further implementation of the power supply system where the active current limiting circuit is located in the embodiment of this disclosure. As shown in FIG. 3, a structure of a power supply system 1" is similar to that of the power supply system 1 shown in FIG. 1, and what is different from FIG. 1 is that in a power factor correction circuit 40', a fifth switch S5 is arranged between the first terminal T1 and the second terminal T2.

In addition, the fifth switch S5 may also be added between the first terminal T1 and the second terminal T2 in the structure shown in FIG. 2.

In the embodiment of this disclosure, a specific structure of the bidirectional switch in the current limiting switch unit may be designed as multiple structures.

FIG. 4 to FIG. 8 are schematic diagrams of different structures of the bidirectional switch in the current limiting switch unit of the embodiment of this disclosure. As shown in FIG. 4 to FIG. 8, for example, S×1, S×2 and S×3 are bidirectional switches, which are composed of two back-to-back IGBT tubes connected in series having parallel diodes, or composed of two back-to-back MOS tubes connected in series having parallel diodes, or composed of an IGBT tube and a diode connected in series, or composed of an IGBT tube and a MOS tube connected in series.

In some embodiments, S×2 and S×3 are unidirectional switches, which are composed of IGBT tubes having diodes, or are composed of a MOS tube and a diode connected in parallel.

In some embodiments, the two IGBT tubes or two MOS tubes of the first current limiting switch S×1 use identical driving signals.

Figure 9:
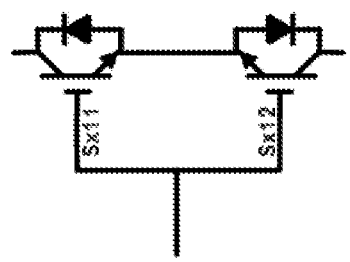
FIG. 9 is a circuit structure diagram of a first current limiting switch of the embodiment of this disclosure.
Figure 10:
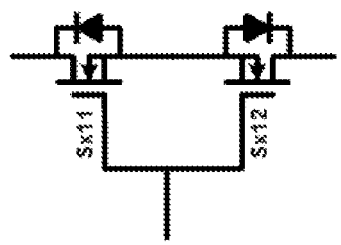
FIG. 10 is another circuit structure diagram of the first current limiting switch in the embodiment of this disclosure.
Figure 11:
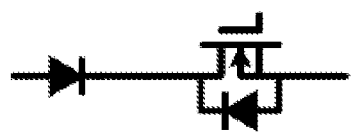
FIG. 11 is a schematic diagram of a structure of a unidirectional switch in the current limiting switch unit of the embodiment of this disclosure.
Figure 12:
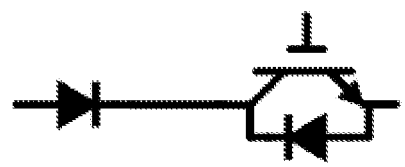
FIG. 12 is a schematic diagram of another structure of the unidirectional switch in the current limiting switch unit of the embodiment of this disclosure.
Figure 13:
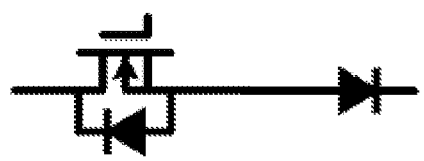
FIG. 13 is a schematic diagram of a further structure of the unidirectional switch in the current limiting switch unit of the embodiment of this disclosure.
Figure 14:
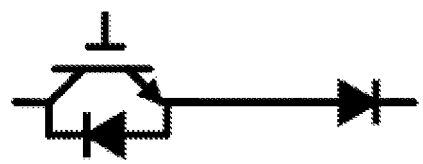
FIG. 14 is a schematic diagram of still another structure of the unidirectional switch in the current limiting switch unit of the embodiment of this disclosure.
Figure 15:
FIG. 15 is a schematic diagram of yet another structure of the unidirectional switch in the current limiting switch unit of the embodiment of this disclosure.
Figure 16:
FIG. 16 is a schematic diagram of yet still another structure of the unidirectional switch in the current limiting switch unit of the embodiment of this disclosure.
Figure 17:
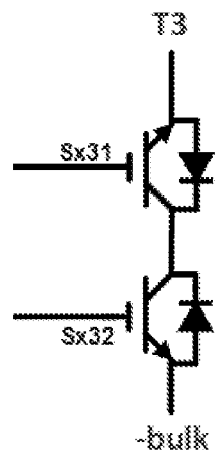
FIG. 17 to FIG. 24 show schematic diagrams of different structures of a bidirectional switch S×2 or S×3 in the embodiment of this disclosure.
Figure 18:
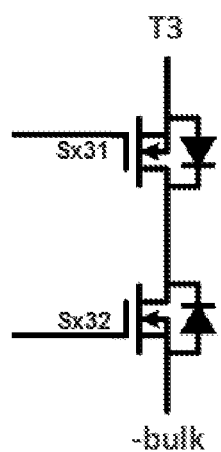
Figure 19:
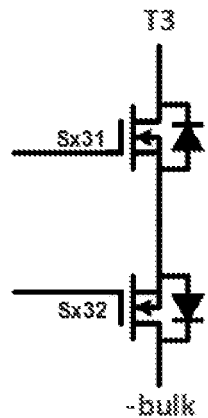
Figure 20:
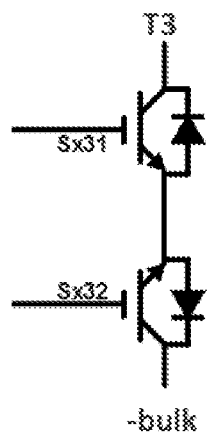
Figure 21:
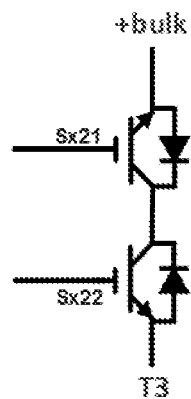
Figure 22:
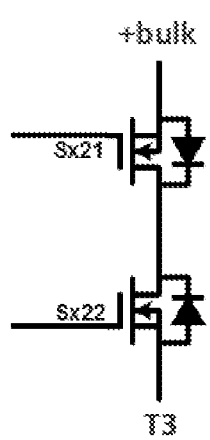
Figure 23:
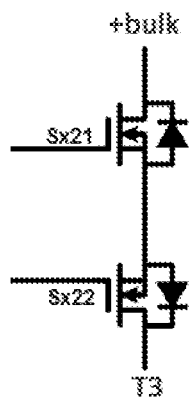
Figure 24:
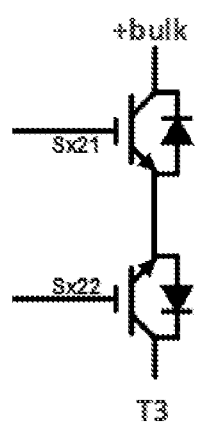
Figure 25:
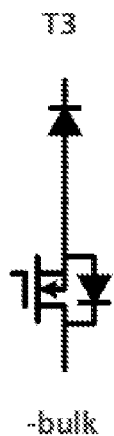
FIG. 25 to FIG. 36 show schematic diagrams of different structures of a unidirectional switch S×2 or S×3 in the embodiment of this disclosure.
Figure 26:
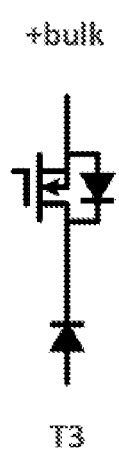
Figure 27:
Figure 28:
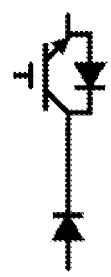
Figure 29:
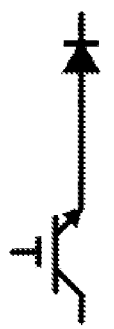
Figure 30:
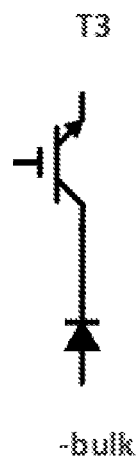
Figure 31:
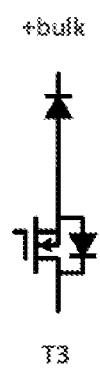
Figure 32:
Figure 33:
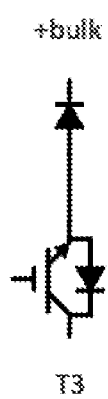
Figure 34:
Figure 35:
Figure 36:

FIG. 9 is a circuit structure diagram of the first current limiting switch of the embodiment of this disclosure, and FIG. 10 is another circuit structure diagram of the first current limiting switch in the embodiment of this disclosure. As shown in FIG. 9, two IGBT tubes S×11 and S×12 of the first current limiting switch S×1 use identical driving signals; and as shown in FIG. 10, two MOS tubes S×11 and S×12 of the first current limiting switch S×1 use identical driving signals.

FIG. 11 to FIG. 16 are schematic diagrams of different structures of the unidirectional switch in the current limiting switch unit of the embodiment of this disclosure. As shown in FIG. 11 to FIG. 16, S×2 and S×3 are unidirectional switches, which are composed of IGBT tubes having diodes connected in parallel, or an MOS tube and a diode connected in series.

For the case where S×2 or S×3 are bidirectional switches, FIG. 17 to FIG. 24 show schematic diagrams of different structures of the bidirectional switch S×2 or S×3 in the embodiment of this disclosure.

In some embodiments, when the first voltage is higher than the second voltage, the control unit 304 generates a control signal for turning on an IGBT tube or MOS tube S×31 (FIG. 17 and FIG. 18) or S×32 (FIG. 19 and FIG. 20) in S×3 having parallel diodes with a flowing direction from the third terminal T3 to the negative pole –bulk of the capacitor CB; in addition, driving of the remaining S×32 or S×31 may be turned on or off according to the above current signals, and may flow via their own anti-parallel diodes;

and when the first voltage is lower the second voltage, the control unit 304 generates a control signal for turning on an IGBT tube or MOS tube S×21 (FIG. 21 and FIG. 22) or S×22 (FIG. 23 and FIG. 24) in S×2 having parallel diodes with a flowing direction from the positive pole+bulk of the capacitor CB to the third terminal T3; in addition, driving of the remaining S×22 or S×21 may be turned on or off according to the above current signals, and may flow via their own anti-parallel diodes.

For the case where S×2 or S×3 is a unidirectional switch, S×2 or S×3 is composed of an IGBT tube and a diode connected in series, or S×2 or S×3 is composed of IGBT an IGBT tube or MOS tube having a parallel diode and a diode connected in series.

FIG. 25 to FIG. 36 show schematic diagrams of different structures of the unidirectional switch S×2 or S×3 in the embodiment of this disclosure.

In some embodiments, when the first voltage is higher than the second voltage, the control unit 304 generates a control signal for turning on the IGBT tube or MOS tube of S×3; and when the first voltage is lower than the second voltage, the control unit generates a control signal for turning on the IGBT tube or MOS tube of S×2.

In some embodiments, the control unit 304 may also use a fixed switching frequency to control the driving of the first current limiting switch S×1, wherein the first current limiting switch S×1 is turned on at a time within a switching period. When an absolute value of the current sampling signal is greater than a second threshold, the first current limiting switch S×1 is turned off, until a fixed time of a next switching period, and then the first current limiting switch S×1 is turned on. Wherein, a switching frequency may be selected as a fixed switching frequency according to the actual situation. In addition, a specific value of the second threshold may also be set according to an actual situation.

In some embodiments, the current limiting switch unit 301 may further include a fourth current limiting switch S×4 in parallel with the first current limiting switch S×1. The fourth current limiting switch S×4 is a bidirectional switch, and is configured to turn on when the power factor correction circuit 40 operates normally and turn off when the power factor correction circuit 40 charges the capacitor CB. In this way, losses during normal operation may be reduced, and overall efficiency may be improved.

In some embodiments, the power factor correction circuit may further include a second inductor, a sixth switch and a seventh switch. An input end of the second inductor is connected to the first output end of the current limiting switch unit 301, and the output end of the first inductor is connected to a third terminal between the sixth switch and the seventh switch. In this way, it may operate in a multi-phase interlaced mode, and input ripple currents may be reduced.

Figure 37:
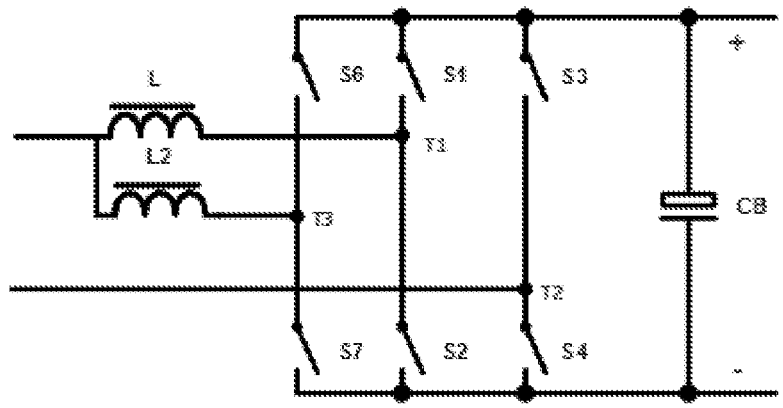
FIG. 37 is another circuit structure diagram of the power factor correction circuit of the embodiment of this disclosure.

FIG. 37 is another circuit structure diagram of the power factor correction circuit of the embodiment of this disclosure. As shown in FIG. 37, in the power factor correction circuit 40, the power factor correction circuit 40 further includes a second inductor L2, a sixth switch S6 and a seventh switch S7. An input end of the second inductor L2 is connected to the first output end of the current limiting switch unit, and an output end of the second inductor L2 is connected to a third terminal T3 between the sixth switch S6 and the seventh switch S7. In addition, S6 is similar to S1, and S7 is similar to S2.

In some embodiments, n groups of circuit structures including the inductor L2, the switch S6 and the switch S7 may be added to the power factor correction circuit 40; where, n is a positive integer.

It should be noted that the circuit in the above example may further include components not shown in the drawings, and reference may be made to existing technologies for details, which are not limited in the embodiment of this disclosure. Or, the circuit does not necessarily include all the components shown in FIG. 1 or FIG. 2, which shall not be illustrated herein any further.

For the sake of simplicity, connection relationships between the components or modules or signal profiles thereof are only illustrated in FIG. 1 to FIG. 37. However, it should be understood by those skilled in the art that such related techniques as electrical connection, etc., may be adopted, which is not limited in the embodiment of this disclosure.

The above implementations only illustrate the embodiment of this disclosure. However, this disclosure is not limited thereto, and appropriate variants may be made on the basis of these implementations. For example, the above implementations may be executed separately, or one or more of them may be executed in a combined manner.

It can be seen from the above embodiment that multiple current limiting switches in the active current limiting circuit are turned on or off based on the current sampling signal and the result of comparison of voltages obtained by sampling currents in the current limiting switch unit of the active current limiting circuit or currents in the power factor correction circuit and voltages at the first end and second end of the input bus. With the active current limiting circuit, the inrush current generated in switching the power supply lines may be efficiently reduced, power consumption may be lowered, output of large power may be provided, the capacitor may be charged and sufficient power output may be provided to the load. Furthermore, multiple current limiting switches may be flexibly controlled by using the current sampling signal and the result of comparison of the voltages at the two ends of the input bus, thereby improving operating efficiency of the current limiting circuit.

Embodiment 2

Figure 38:
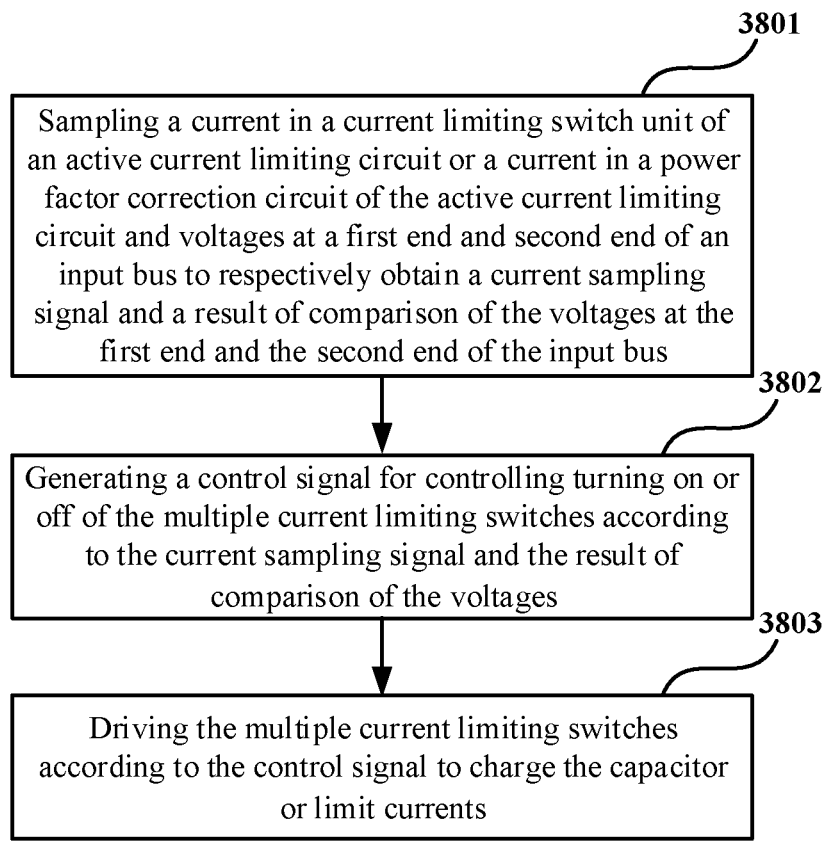
FIG. 38 is a schematic diagram of the control method of an embodiment of this disclosure.

The embodiments of this disclosure further provide a method for controlling an active current limiting circuit. FIG. 38 is a schematic diagram of the control method of an embodiment of this disclosure. As show in FIG. 38, the control method includes:

step 3801: sampling a current in a current limiting switch unit of an active current limiting circuit or a current in a power factor correction circuit of the active current limiting circuit and voltages at a first end and second end of an input bus to respectively obtain a current sampling signal and a result of comparison of the voltages at the first end and the second end of the input bus;

step 3802: generating a control signal for controlling turning on or off of the multiple current limiting switches according to the current sampling signal and the result of comparison of the voltages; and step 3803: driving the multiple current limiting switches according to the control signal to charge the capacitor or limit currents.

Reference may be made to in Embodiment 1 for a specific structure of the active current limiting circuit and implementations of steps 3801 to 3803, with repeated parts being not going to be described herein any further.

For example, in step 3803, in a case where the first voltage of the first end of the input bus is higher than the second voltage of the second end of the input bus, a first control signal is generated when an absolute value of the current sampling signal is less than a first threshold, and the multiple current limiting switches are driven according to the first control signal, so that the power factor correction circuit charges the capacitor; and a second control signal is generated when the absolute value of the current sampling signal is greater than or equal to the first threshold, and the multiple current limiting switches are driven according to the second control signal to limit currents;

and in a case where the first voltage of the first end of the input bus is lower than the second voltage of the second end of the input bus, a third control signal is generated when the absolute value of the current sampling signal is less than the first threshold, and the multiple current limiting switches are driven according to the third control signal, so that the power factor correction circuit charges the capacitor; and a fourth control signal is generated when the absolute value of the current sampling signal is greater than or equal to the first threshold, and the multiple current limiting switches are driven according to the fourth control signal to limit currents.

It can be seen from the above embodiment that multiple current limiting switches in the active current limiting circuit are turned on or off based on the current sampling signal and the result of comparison of voltages obtained by sampling currents in the current limiting switch unit of the active current limiting circuit or currents in the power factor correction circuit and voltages at the first end and second end of the input bus. With the active current limiting circuit, the inrush current generated in switching the power supply lines may be efficiently reduced, power consumption may be lowered, output of large power may be provided, the capacitor may be charged and sufficient power output may be provided to the load. Furthermore, multiple current limiting switches may be flexibly controlled by using the current sampling signal and the result of comparison of the voltages at the two ends of the input bus, thereby improving operating efficiency of the current limiting circuit.

The embodiment of this disclosure further provides a power supply device, including the active current limiting circuit as described in Embodiment 1. For example, the power supply device further includes a power factor correction circuit and a capacitor, with repeated parts being not going to be described herein any further.

The embodiment of this disclosure further provides a power supply system, including at least two input power supply lines, an input bus, a power factor correction circuit, a capacitor, and the active current limiting circuit as described in Embodiment 1, the power factor correction circuit being coupled via the input bus to the at least two input power supply lines that are able to be switched, and the capacitor being connected to an output side of the power factor correction circuit, such as the power supply system shown in FIG. 1 or FIG. 2 or FIG. 3.

An embodiment of this disclosure provides a computer readable program, which, when executed in a power supply device or an active current limiting circuit, will cause the active current limiting circuit to carry out the method as described in Embodiment 2.

An embodiment of this disclosure provides a computer readable medium, including a computer readable program code, which will cause a power supply device or an active current limiting circuit to carry out the method as described in Embodiment 2.

The circuit/method described with reference to the embodiments of this disclosure may be directly embodied as hardware, software modules executed by a processor, or a combination thereof. For example, one or more functional block diagrams and/or one or more combinations of the functional block diagrams shown in FIG. 1 or FIG. 2 or FIG. 3 may either correspond to software modules of procedures of a computer program, or correspond to hardware modules. Such software modules may respectively correspond to the steps shown in FIG. 38. And the hardware module, for example, may be carried out by firming the soft modules by using a field programmable gate array (FPGA).

The soft modules may be located in an RAM, a flash memory, an ROM, an EPROM, and EEPROM, a register, a hard disc, a floppy disc, a CD-ROM, or any memory medium in other forms known in the art. A memory medium may be coupled to a processor, so that the processor may be able to read information from the memory medium, and write information into the memory medium; or the memory medium may be a component of the processor. The processor and the memory medium may be located in an ASIC. The soft modules may be stored in a memory of a mobile terminal, and may also be stored in a memory card of a pluggable mobile terminal.

One or more functional blocks and/or one or more combinations of the functional blocks in the drawings may be realized as a universal processor, a digital signal processor (DSP), an application-specific integrated circuit (ASIC), a field programmable gate array (FPGA) or other programmable logic devices, discrete gate or transistor logic devices, discrete hardware component or any appropriate combinations thereof carrying out the functions described in this application. And the one or more functional block diagrams and/or one or more combinations of the functional block diagrams in the drawings may also be realized as a combination of computing equipment, such as a combination of a DSP and a microprocessor, multiple processors, one or more microprocessors in communication combination with a DSP, or any other such configuration.

This disclosure is described above with reference to particular embodiments.

However, it should be understood by those skilled in the art that such a description is illustrative only, and not intended to limit the protection scope of the present disclosure. Various variants and modifications may be made by those skilled in the art according to the principle of the present disclosure, and such variants and modifications fall within the scope of the present disclosure.

The invention claimed is:

1. An active current limiting circuit applicable to a power supply system, the power supply system including at least two input power supply lines, an input bus, a power factor correction circuit, a capacitor, and the active current limiting circuit, the power factor correction circuit coupled via the input bus to the at least two input power supply lines that are able to be switched, and the capacitor connected to an output side of the power factor correction circuit, the active current limiting circuit comprising:

a current limiting switch unit including multiple current limiting switches, an input end of the current limiting switch unit is connected to the input bus, and an output end of the current limiting switch unit is connected to the power factor correction circuit, wherein the current limiting switch unit to turn on or off the multiple current limiting switches according to a current sampling signal in the current limiting switch unit or a current sampling signal in the power factor correction circuit and a result of comparison of voltages at a first end and a second end of the input bus, and wherein the multiple current limiting switches of the current limiting switch unit includes a first current limiting switch, a second current limiting switch and a third current limiting switch, the first current limiting switch is a bidirectional switch, the second current limiting switch and the third current limiting switch are bidirectional switches or unidirectional switches, and a first output end and second output end of the current limiting switch unit are respectively connected to the power factor correction circuit.

2. The active current limiting circuit according to claim 1, wherein the active current limiting circuit further comprises:
   a first sampling unit to sample a current in the current limiting switch unit or a current in the power factor correction circuit to obtain a current sampling signal;
   a second sampling unit to sample and compare the voltages at the first end and second end of the input bus to obtain the result of comparison of a first voltage at the first end and a second voltage at the second end of the input bus; and
   a control unit to generate a control signal to control turning on or off of the multiple current limiting switches according to the current sampling signal and the result of comparison of the voltages, and drive the multiple current limiting switches according to the control signal to charge the capacitor or limit currents.

3. The active current limiting circuit according to claim 2, wherein,
   in a case where the first voltage is higher than the second voltage, the control unit is to, generate a first control signal when an absolute value of the current sampling signal is less than a first threshold, and drive the multiple current limiting switches according to the first control signal, so that the power factor correction circuit charges the capacitor; and generate a second control signal when the absolute value of the current sampling signal is greater than or equal to the first threshold, and drive the multiple current limiting switches according to the second control signal to limit currents.

4. The active current limiting circuit according to claim 2, wherein,
   in a case where the first voltage is lower than the second voltage, the control unit is to, generate a third control signal when an absolute value of the current sampling signal is less than a first threshold, and drive the multiple current limiting switches according to the third control signal, so that the power factor correction circuit charges the capacitor; and generate a fourth control signal when the absolute value of the current sampling signal is greater than or equal to the first threshold, and drive the multiple current limiting switches according to the fourth control signal to limit currents.

5. The active current limiting circuit according to claim 1, wherein,
   a first end of the first current limiting switch is connected to the first end of the input bus, a second end of the first current limiting switch is connected at a third terminal between the second current limiting switch and the third current limiting switch, a first end of the second current limiting switch is connected to the third terminal, a second end of the second current limiting switch is connected to the first output end of the current limiting switch unit, a first end of the third current limiting switch is connected to the third terminal, and a second end of the third current limiting switch is connected to the second output end of the current limiting switch unit.

6. The active current limiting circuit according to claim 1, wherein,
   the first end of the first current limiting switch is connected to the second end of the input bus, the second end of the first current limiting switch is connected at a second terminal between two switches of the power factor correction circuit, the first end of the second current limiting switch is connected at a third terminal between the first end of the input bus and an input end of a first inductor of the power factor correction circuit, the second end of the second current limiting switch is connected to the first output end of the current limiting switch unit, the first end of the third current limiting switch is connected to the third terminal, and the second end of the third current limiting switch is connected to the second output end of the current limiting switch unit.

7. The active current limiting circuit according to claim 1, wherein,
   the power factor correction circuit comprises a first switch, a second switch, a third switch and a fourth switch, an input end of a first inductor of the power factor correction circuit is connected at a third terminal, an output end of the first inductor is connected at a first terminal between the first switch and the second switch, the first end of the first switch is connected to the first output end of the current limiting switch unit, the second end of the first switch and the first end of the second switch are connected to the first terminal, and a second end of the second switch is connected to the second output end of the current limiting switch unit.

8. The active current limiting circuit according to claim 1, wherein,
   the first current limiting switch includes two back-to-back IGBT tubes connected in series having parallel diodes, or,
   the first current limiting switch includes two back-to-back MOS tubes connected in series having parallel diodes, or,
   the first current limiting switch includes an IGBT tube and a diode connected in series.

9. The active current limiting circuit according to claim 1, wherein,
   the second current limiting switch and third current limiting switch include two back-to-back IGBT tubes connected in series having parallel diodes, or,
   the second current limiting switch and third current limiting switch includes two back-to-back MOS tubes connected in series having parallel diodes, or,
   the second current limiting switch and third current limiting switch includes an IGBT tube and a diode connected in series, or
   the second current limiting switch and third current limiting switch includes an IGBT tube or MOS tube having a parallel diode and a diode connected in series.

10. The active current limiting circuit according to claim 1, wherein,
    a control unit is to control driving of the first current limiting switch by using a fixed switching frequency.

11. The active current limiting circuit according to claim 1, wherein,
    the current limiting switch unit further comprises a fourth current limiting switch in parallel with the first current limiting switch, the fourth current limiting switch being a bidirectional switch,
    and the fourth current limiting switch to be turned on when the power factor correction circuit operates normally, and turned off when the power factor correction circuit charges the capacitor.

12. A power supply device, wherein the power supply device comprises the active current limiting circuit as claimed in claim 1.

13. A power supply system, wherein the power supply system comprises at least two input power supply lines, an input bus, a power factor correction circuit, a capacitor, and the active current limiting circuit as claimed in claim 1, the power factor correction circuit coupled via the input bus to the at least two input power supply lines that are able to be switched, and the capacitor connected to an output side of the power factor correction circuit.

14. A method for controlling an active current limiting circuit, the method comprising:
   sampling a current in a current limiting switch unit of the active current limiting circuit as claimed in claim 1 or a current in a power factor correction circuit of the active current limiting circuit and voltages at a first end and second end of an input bus to respectively obtain a current sampling signal and a result of comparison of the voltages at the first end and the second end of the input bus;
   generating a control signal for controlling turning on or off of the multiple current limiting switches according to the current sampling signal and the result of comparison of the voltages; and
   driving the multiple current limiting switches according to the control signal to charge the capacitor or limit currents.

15. The method according to claim 14, wherein,
   in a case where a first voltage of the first end of the input bus is higher than a second voltage of the second end of the input bus, a first control signal is generated when an absolute value of the current sampling signal is less than a first threshold, and the multiple current limiting switches are driven according to the first control signal, so that the power factor correction circuit charges the capacitor; and a second control signal is generated when the absolute value of the current sampling signal is greater than or equal to the first threshold, and the multiple current limiting switches are driven according to the second control signal to limit currents;
   and in a case where the first voltage of the first end of the input bus is lower than the second voltage of the second end of the input bus, a third control signal is generated when the absolute value of the current sampling signal is less than the first threshold, and the multiple current limiting switches are driven according to the third control signal, so that the power factor correction circuit charges the capacitor; and a fourth control signal is generated when the absolute value of the current sampling signal is greater than or equal to the first threshold, and the multiple current limiting switches are driven according to the fourth control signal to limit currents.

* * * * *